United States Patent [19]

Breuning

[11] Patent Number: 4,929,138
[45] Date of Patent: May 29, 1990

[54] DEVICE FOR FEEDING RODLIKE WORKPIECES

[76] Inventor: Kurt Breuning, Sindelfinger Strasse 9,, 7031 Steinenbronn, Fed. Rep. of Germany

[21] Appl. No.: 394,071

[22] Filed: Aug. 15, 1989

Related U.S. Application Data

[63] Continuation of Ser. No. 170,041, Mar. 11, 1988, abandoned, which is a continuation of Ser. No. 893,687, Aug. 6, 1986, abandoned.

[30] Foreign Application Priority Data

Aug. 10, 1985 [DE] Fed. Rep. of Germany ....... 3528743

[51] Int. Cl.$^5$ .............................................. B23Q 5/22
[52] U.S. Cl. ........................................ 414/16; 82/125; 198/463.5; 414/224; 414/745.7; 414/745.9
[58] Field of Search ..................... 414/14–18, 414/222, 224, 745.7, 745.9, 746.1, 746.2, 746.3; 198/463.5, 468.6; 82/125–127

[56] References Cited

U.S. PATENT DOCUMENTS

| | | | |
|---|---|---|---|
| 2,893,348 | 7/1959 | Pearson | 414/748 |
| 2,915,810 | 12/1959 | Taylor et al. | 414/18 X |
| 3,072,267 | 1/1963 | Gasparetti et al. | 414/748 |
| 3,447,694 | 6/1969 | Hartle | 414/15 |
| 3,618,741 | 11/1971 | Berndt | 414/748 X |
| 3,757,964 | 9/1973 | Kaplan | 414/748 |
| 4,535,882 | 8/1985 | Malivoir et al. | 414/745 |
| 4,557,165 | 12/1985 | Werkmeister et al. | 414/18 X |
| 4,604,924 | 8/1986 | Cucchi et al. | 414/16 X |
| 4,640,157 | 2/1987 | Geiser et al. | 414/17 X |
| 4,664,002 | 5/1987 | Cucchi et al. | 414/14 X |
| 4,700,593 | 10/1987 | Cucchi | 82/126 X |

FOREIGN PATENT DOCUMENTS

| | | | |
|---|---|---|---|
| 3443515 | 6/1986 | Fed. Rep. of Germany | 414/748 |
| 463918 | 11/1968 | Switzerland | 414/745 |
| 1335109 | 10/1973 | United Kingdom | 414/224 |

Primary Examiner—Robert J. Spar
Assistant Examiner—William M. Hienz
Attorney, Agent, or Firm—Wolf, Greenfield & Sacks

[57] ABSTRACT

In order to markedly reduce the necessary installation area for a device for feeding rodlike workpieces to a machine tool with at least one rod feed tube for a rodlike workpiece (15) to be processed, feedable from a magazine (16) into the rod feed tube, it is suggested that the rod feed tube is formed by two guide elements which can be lifted off each other for inserting the rodlike workpiece (15) and that the magazine (16) is arranged parallel, below beside or above the guide elements.

32 Claims, 5 Drawing Sheets

DEVICE FOR FEEDING RODLIKE WORKPIECES

This application is a continuation of application Ser. No. 170,041, filed on Nov. 11, 1988 now abandoned which in turn is a continuation of application Ser. No. 893,687, filed Aug. 6, 1986 now abandoned.

FIELD OF THE INVENTION

The present invention relates to a device for feeding rodlike workpieces to a machine tool with at least one rod feed tube for a rodlike workpiece to be processed, feedable from a magazine into the rod feed tube.

DESCRIPTION OF PRIOR ART

German patent application No. 23 00 256 relates to a feed device for a rod feed tube for feeding rodlike workpieces of varying diameter to a machine tool. With this device, the rodlike workpiece has to be inserted into the rod feed tube from the rear end. The space required amounts to at least twice the length of the rodlike workpiece.

German Utility Model No. 70 18 344 relates to another device for feeding rodlike workpieces, equipped without a rod feed tube. With this device, rodlike workpieces may be fed from a machine tool magazine. However, this device is not suitable for feeding modern high speed machine tools, because during processing the rodlike workpiece is guided on its ends only.

OBJECTS AND ADVANTAGES OF THE INVENTION

It is the object of the present invention to improve the feeding of the above-mentioned rodlike workpieces by means of a rod feed tube to such an extent that the magazine for the rodlike workpieces can be arranged to save space, with small length overall, but still maintaining the advantages of good rod feeding by means of the rod feed tube.

In order to achieve this object the invention provides the rod-feed tube to be formed by two guide elements which may be lifted off each other when inserting the rodlike workpiece. The invention furthermore provides for the parallel arrangement of the magazine beside or above the guide elements.

In order to produce the devices for feeding rodlike workpieces of varying lengths economically according to the length requirements of the processed rodlike workpieces, the two guide elements can be put together lengthwise along holding recesses to form the rod guide pipe. In addition, multiple pairs of guide elements can be axially aligned one after the other, so that several identical units may be arranged in tandem to form a total machine.

In order to handle rodlike workpieces of varying diameters with one and the same device for feeding rodlike workpieces, several holding recesses for rodlike workpieces of possibly varying diameters can be provided advantageously at the circumference of two rotating guide elements arranged parallel to each other. The rotating guide element is characterized by a polyhedral cross-section, preferably a hexagonal or octahedral cross-section with a holding recess being provided at each of the polyhedral planes.

For exact feeding of the rodlike workpiece, several guide elements may be aligned on a preferably continuous shaft and may be rotated together and, if necessary, lifted.

In order to create the rod guide pipe, two parallel shafts can be provided with at least one guide element on each, with the two shafts rotating synchronously and preferably in an opposite direction together with their guide elements in order to keep the two guide elements assigned to a certain diameter of the rodlike workpiece.

Exact linear feeding without sagging of the rodlike workpieces can be secured by supporting the shafts between the guide elements by bearings, so that one of the shafts is adjustable in its spacing from the other shaft for the purpose of lifting the guide elements and inserting the new rod material. For this, the bearings are located at the end of a lifting or swivel arm, and the lifting or swivel arms can be moved jointly.

In order to handle longer rodlike workpieces, several stands are attached to a carrying support for carrying and moving at least two rows of guide elements arranged opposite each other. In order to provide safe lubrication and at the same to cut down noises, the carrying support, together with the stands, cylinders, supports and at least one part of the magazine, is placed in an oil sump. Then, no special effort needs to be made for the lubricant extruding from the individual supports to be collected and returned.

The rodlike workpiece is fed via a pusher, and for this feeding process as well as for the flexible means of transportation of the pusher, a recess is provided parallel to the semicircular holding recesses.

If a rodlike workpiece with a different diameter is to be fed, the guide elements need to be rotated, in which case the means of transportation and, if necessary, the pusher can be lifted from the lower guide elements by means of a hoisting device. For this, the means of transportation is guided by an arm. For simultaneous feeding of the lubricant into the lower guide recess, this arm may be tubular shaped.

Slotted pipe pieces are provided for the means of transportation at the end of the arms. This means of transportation is equipped with a holder which, by means of lowering or lifting the means of transportation can be coupled or decoupled automatically by means of a blade residing on the pusher. The holder is preferably provided with a u-shaped recess in which the pusher blade engages. The means of transportation itself is preferably a revolving chain.

In order to safely insert a rodlike workpiece in a guide element or in one section of the holding recess of a guide element, the magazine provides at least two insertion arms, arranged parallel to each other, movable by an eccentric over a common drive shaft. The ends of the insertion arms can be guided to the guide element(s) with their one end carrying a rodlike workpiece. Particularly exact insertion in combination with the eccentric is movably fed on a guide pipe located about halfway between the guide element(s) and the eccentric.

In order to automatically have available the required pusher at the time, a pusher magazine may be provided as an extension of one of the guide elements, with workpiece pushers for feeding rodlike workpieces of varying diameters. The pusher magazine provides a number of pushers corresponding to the number of holding recesses.

The material supply means can be especially well designed if one of the shaped bodies corresponding to the guide elements has a polygonal shape, so that this is a flying pick-up area for a pusher for each holding recess of the polygon.

Each pick-up area can be formed by a semicircular pusher guide element and at least one support, with a slot being provided between the guide element and the support for a pusher blade. In order to move the pusher, the blade of the workpiece pusher, which moves the rodlike workpiece, can engage with at least one lead step in a recess. The recess can be formed in the form of a chain link or a holder of the means of transportation, or on the contrary, at least one lead step of the means of transportation engages in an assigned recess of the blade.

A particularly advantageous feature is that for each support guide element a pick-up area, sized to the diameter of the rodlike workpiece, is provided on the shaped body, and in the case of a change of diameter, one holding recess is rotated towards the corresponding holding recess and accordingly also the shaped body pick-up area relating to the appropriate workpiece pusher towards the corresponding feeding position. In that case, automatic coupling takes place when the two holding recesses assigned to the workpiece pushers are joined with the means of transportation.

The body containing the pick-up areas can, depending on the supports, be placed between stands and can be rotabaly coupled with the guide elements, for example, via a common chain drive.

Further features relating to the invention can be found in the subclaims; details of their advantages will be given in the subsequent description.

ACCOMPANYING DRAWINGS

Figure 5:
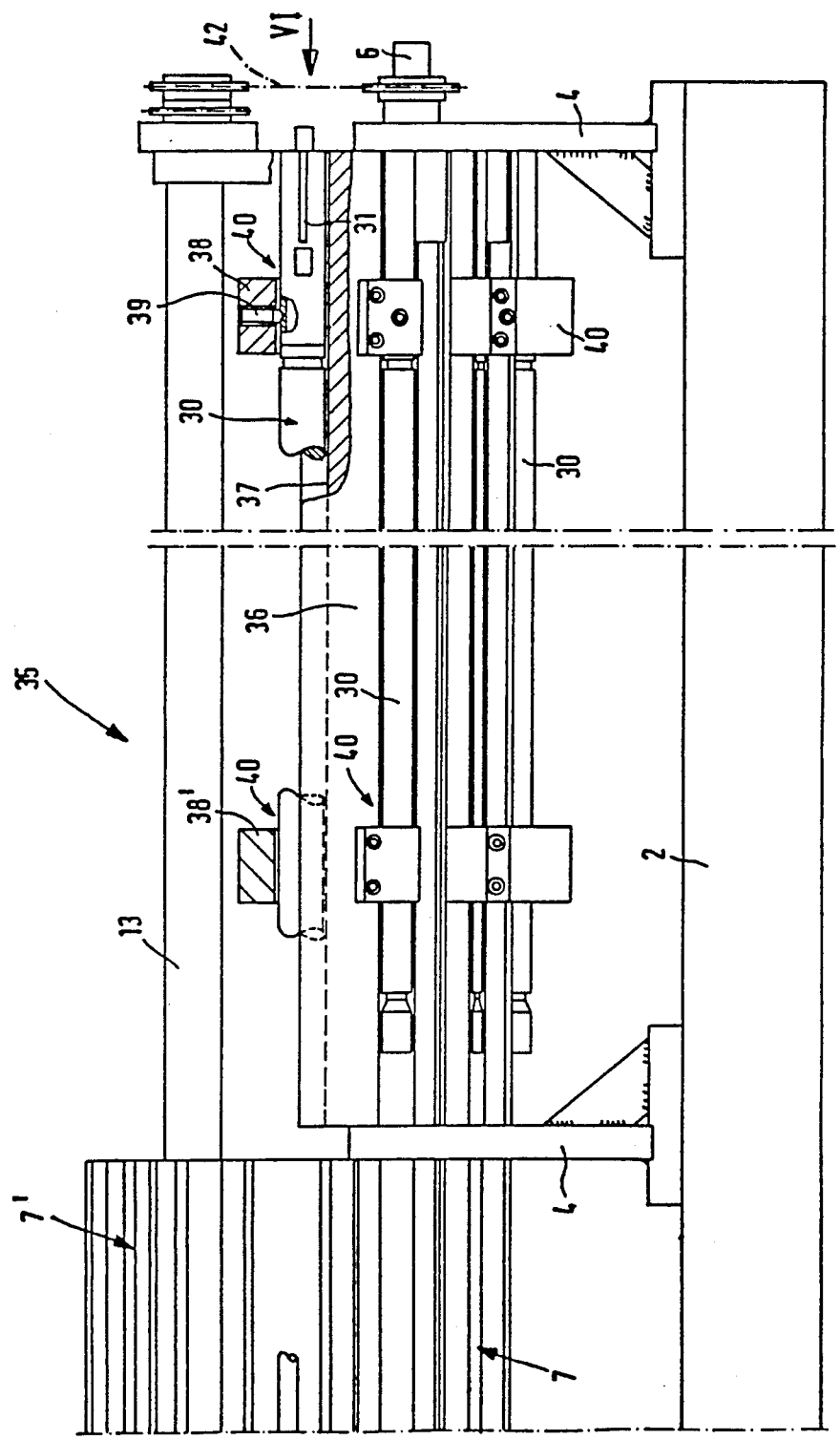

FIG. 5 a view of the workpiece pusher magazine.

Figure 6:
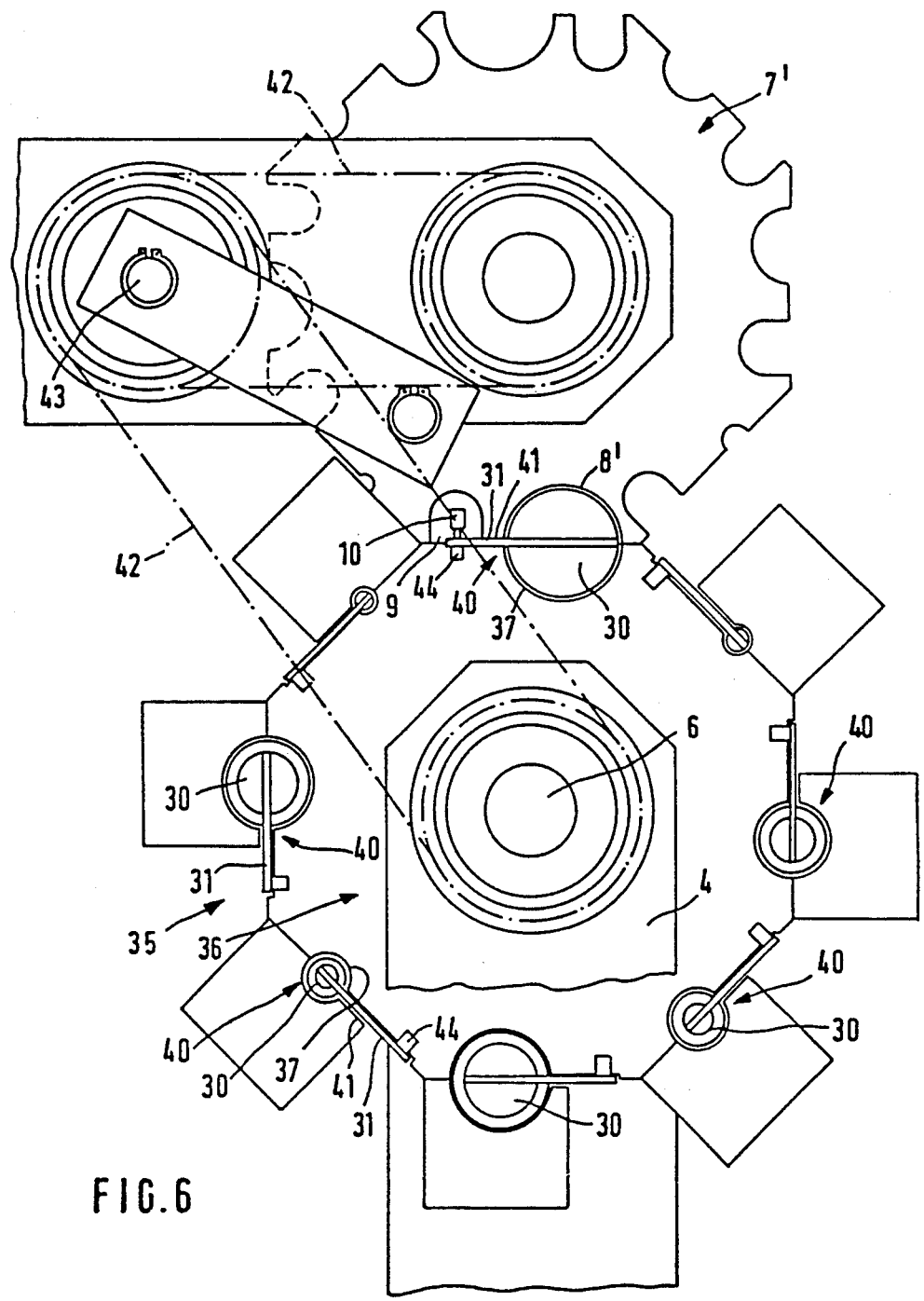

FIG. 6 a sectional view in the direction of arrow VI of the workpiece pusher magazine.

DESCRIPTION OF THE PREFERRED EMBODIMENTS OF THE INVENTION

Several stands 3, 4, 5 are placed behind each other in an oil sump 1 on a carrying support 2. By means of the first stands 4 a continuous shaft 6 is rotatably mounted on a bearing shaft; the lower guide elements 7 are locked onto the shaft 6 between the individual first stands 4. Each of these rotatable guide elements 7 is about 600 mm (23.6") long. All of them are made of solid plastic and show an octagonal cross-section in the detailed drawing. On every surface of this octagonal cross-section a holding recess 8 is arranged, in the same place, with varying semicircular cross-section. Further, next to every holding recess 8, a guiding recess 9 is provided for a means of transportation 10 through which a workpiece pusher 30, not described in detail, reaching into the uppermost positioned holding recess 8, can be moved inside the holding recess 8.

Figure 2:
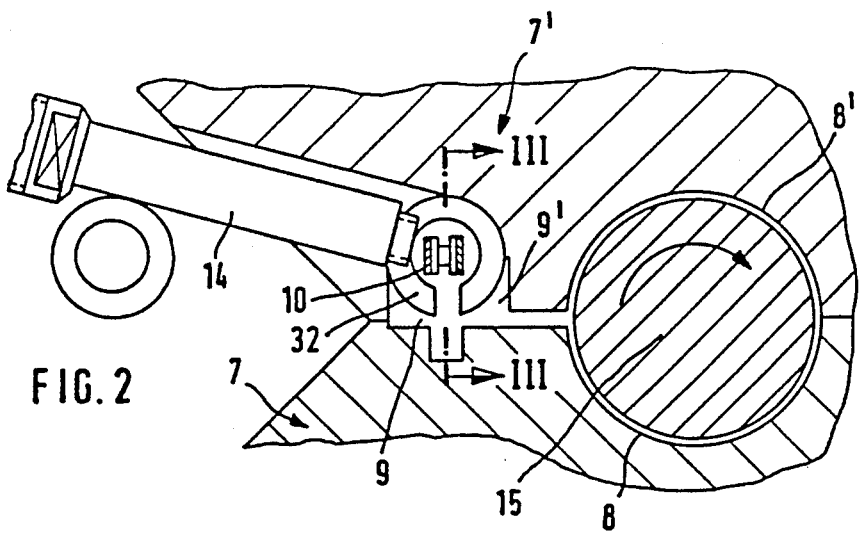
FIG. 2 is a partial sectional view in larger scale showing two guide elements placed on top of each other.

At second stands 3 pivot arms 11 can be rotated via a cylinder 12, in the free end of which bearings support a second continuous shaft 13, which can be lifted and lowered. On this second shaft 13, identical upper [supports] guide elements 7' are mounted between the pivot arms 11, fixed on the second shaft 13 against rotation, showing identical holding recesses 8'. In order to create room for means of transportation 10, the guiding recesses 9' have larger dimensions than those of the lower guide elements 7, as is shown in FIG. 2 in considerably larger scale.

In order not to get into conflict with the means of transportation 10 when rotating the guide elements 7, 7', the means of transportation 10 can be lifted via a two-arm 14, 29 lifting device 28 by means of cylinder 27.

The means of transportation 10 is, at about its center, guided by one of the guiding arms 14 reaching into the upper guide elements 7'. These guiding arms 14 are of tubular shape and a lubricant may be fed through them, flowing via the [guide] guiding recesses 9, 9' into the holding recesses 8, 8' of the guide elements 7, 7'. In the individual holding recesses 8, 8' a rodlike workpiece 15 to be fed to a machine tool, according to detailed description given later on, is fed via a workpiece pusher 30 to the machine tool, in which case even at a high speed, knocking of the rodlike workpiece 15 will be prevented by the lubricant with simultaneous muffling of the noises.

Figure 1:
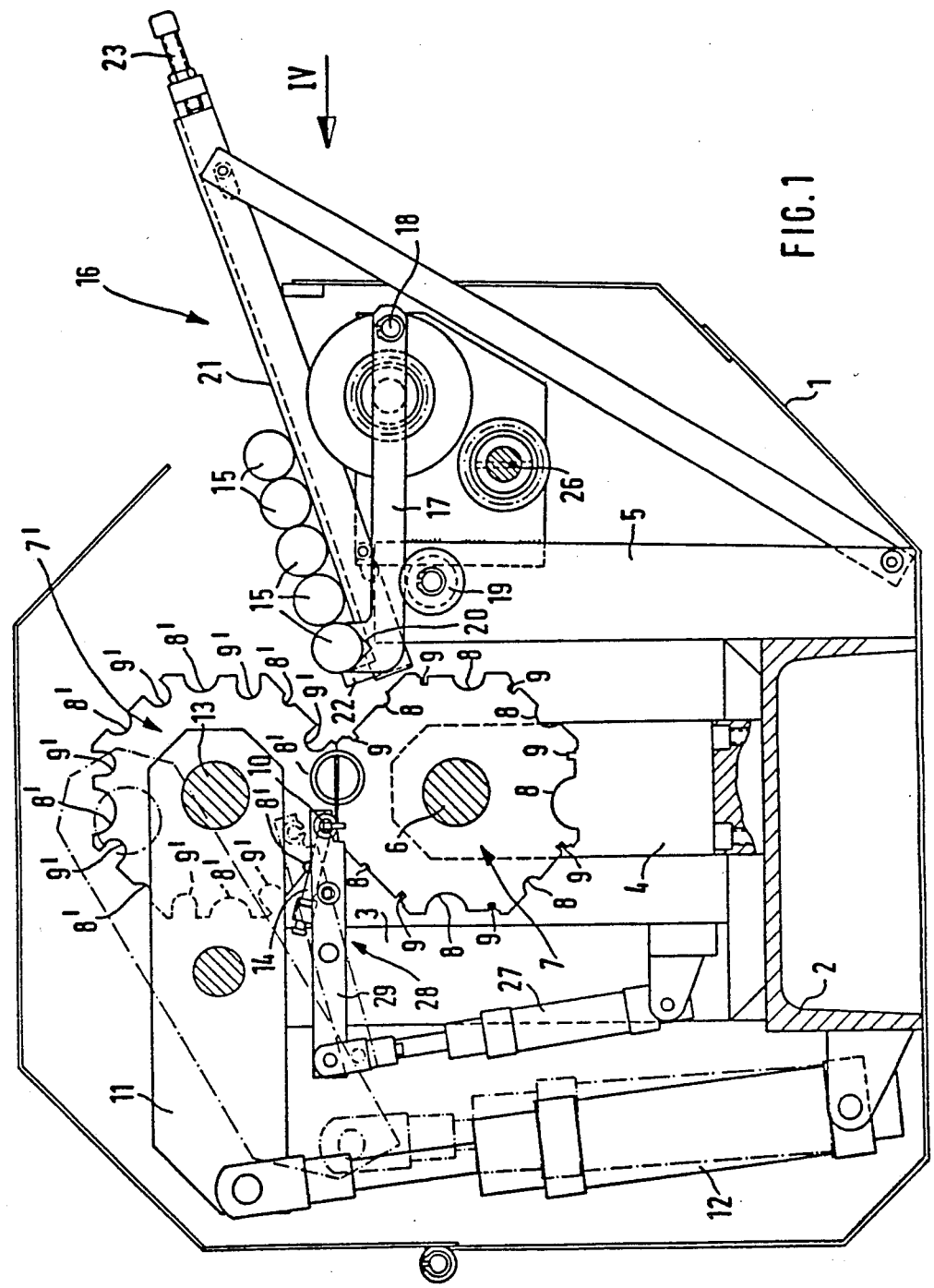
FIG. 1 is a cross-sectional view of a device for feeding rodlike workpieces.

In order to insert a new rodlike workpiece 15, the upper guide elements 7', as indicated in FIG. 1 by a dotted line, may be lifted via the cylinders 12 and the pivot arms 11 so that the holding recesses 8, 8', separate from each other, and are free to accept the new rodlike workpiece 15 which is taken from a magazine 16, arranged parallel and next to the carrying support 2. This magazine 16 is provided with stands 5, along with several catching levers 17, depending on the length of the workpiece 15, may be moved via synchronous eccentrics 18 along guide rollers 19. The ends of the catching levers 17 form an angle and are provided with a v-cutout 20 for the reception of a single rod like workpiece 15. FIG. 1 shows the idle position of a catching lever 17. The lowest rodlike workpiece 15 is held in the v-cutout 20 and at stoppers 22 located at the lower end of the magazine guide surface 21. In order to adjust to varying diameters of rodlike workpieces 15, the stoppers 22 may be adjusted via adjustment mechanism 23 so that a single rodlike workpiece 15 may roll into the v-cutout 20.

The distance of the v-cutout 20 of the catching levers 17 in the idle position from the holding recesses 8 of the lower guide elements 7 is exactly equivalent to the eccentric lift. When rotating the eccentrics 18 synchronously, the rodlike workpiece 15, by suitable arrangement of the guide rollers 19, is inserted in the holding recess 8 from above by moving in a somewhat circular arc. In this, the ends of catching levers 17 with the v-cutout 20 are guided alongside the lower guide elements 7.

Figure 4:
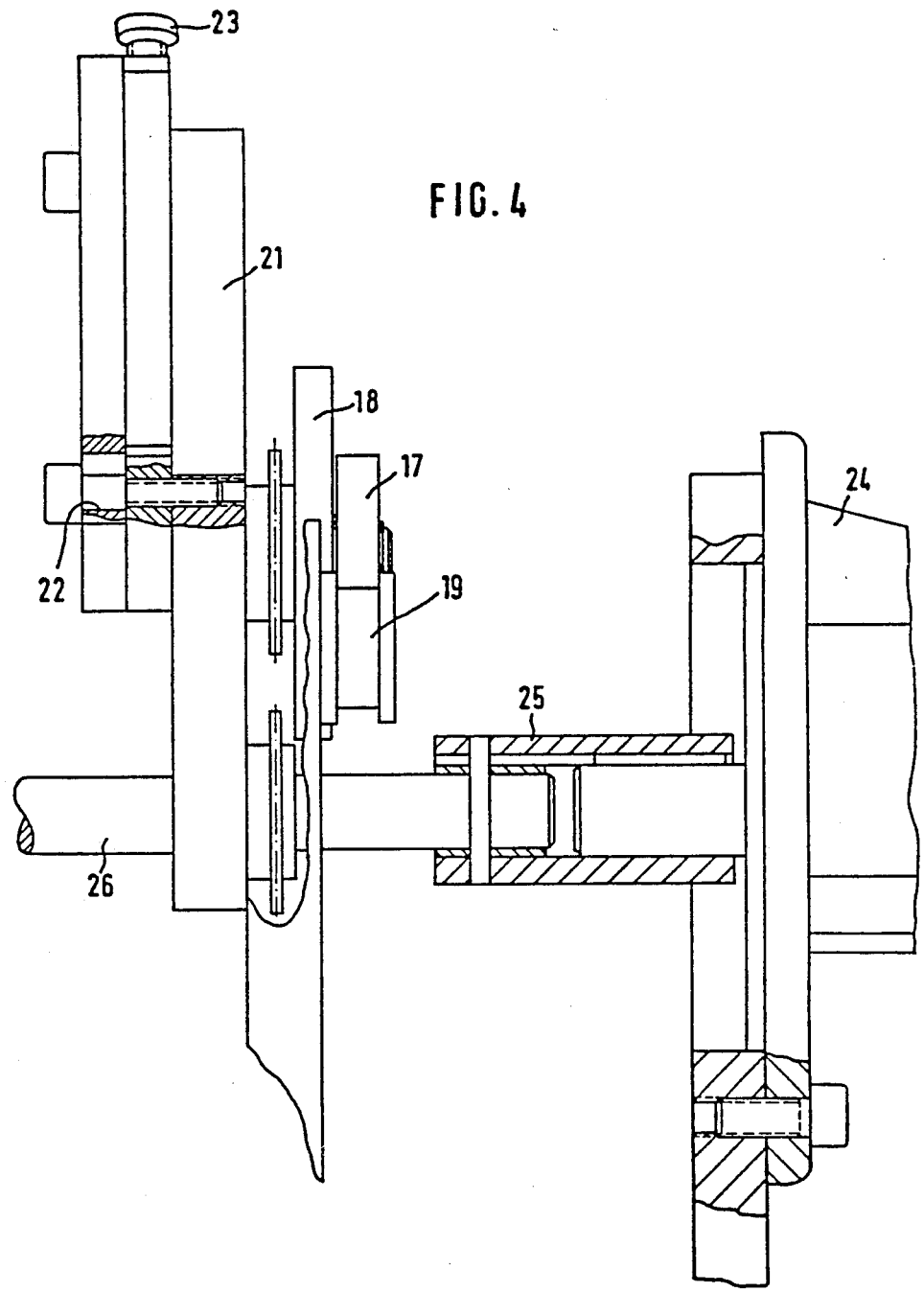
FIG. 4 is a partial sectional view of a magazine, in the direction of arrow IV in FIG. 1, in larger scale.

For synchronous drive of the eccentrics 18, a drive shaft 26, driven via a drive motor 24 by means of a coupling 25, is provided, arranged parallel to the carrying support 2, as can be seen in FIGS. 4 and 1.

According to the length of the rodlike workpieces 15 to be processed, a varying number of guide elements 7, 7' can be arranged on the carrying support 2, that is in the form of identically shaped elements so that a modular concept design can be effected. Accordingly, magazine 16, too, can be made up of several spaced elements, with the number of elements of magazine 16 not necessarily being equal to the number of elements of guide elements 7, 7'.

Figure 3:
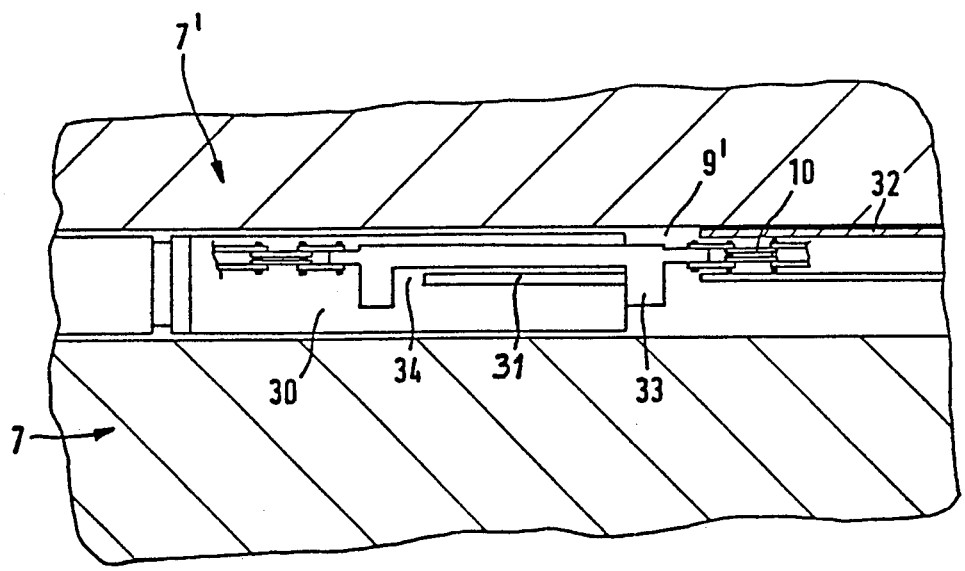
FIG. 3 is a partial section according to line III in FIG. 2 showing the feed of the means of transportation and its coupling with a workpiece pusher.

As can be seen from FIGS. 2 and 3, the workpiece pusher 30 is equipped with a blade 31, reaching into the recess of guide element 7 and is guided in a slot 44. For means of transportation 10, a revolving chain is mounted in slotted tubes 32 arranged at the end of the guiding arms 14. A holder 33, reaching out of the slotted tube 32 is arranged in the chain of the means of transportation 10, only illustrated in FIG. 3. This holder 33 shows a u-shaped recess 34, accommodating the workpiece pusher blade 31. As described above, the means of transportation 10 can be lifted together with the holder 33 and the upper guide elements 7' so that means of transportation 10 and workpiece pusher 30 are decoupled.

In order to process rodlike workpieces 15 of varying diameters, at the circumference of the guide elements 7, 7' holding recesses 8, 8' of different shape are provided. As an extension of the lower guide elements 7, a workpiece pusher magazine 35 is also rotatably mounted between stands 4, and is synchronously rotatable with the guide elements 7. In body the 36 of the workpiece pusher 35 corresponding to the lower guide elements 7, for every holding recess 8, a pusher guide recess 37 is provided for each workpiece pusher 30. As illustrated in FIGS. 5 and 6, the workpiece pushers 30 in their idle position are held by two brackets 38, 38', by a spring-loaded pin 39 mounted in the bracket 38 or 38', which in its idle position engages in a recess of the workpiece pusher 30. A gap 41 is also formed for the blade 31 of the workpiece pusher 30 between the pusher guide recess 37 and the bracket 38, which, together, form parts of receptacles 40 for workpiece pushers 30.

FIGS. 5 and 6 show that for synchronous rotation, of guide elements 7, 7' as well as of the polygonal shaped body 36 of workpiece pusher magazine 35, are coupled via chain drive 42 with a common shaft 43 which can only be driven if the upper guide elements 7' are lifted off the lower guide elements 7 in order to set up the device for feeding rodlike workpieces of a different diameter. The workpiece pusher 30 is coupled automatically with the means of transportation 10 when the upper guide elements 7' are rotated and lowered again.

What I claim is:

1. A device for feeding rodlike workpieces to a machine tool with at least one rod guide pipe for a rodlike workpiece to be processed, fed from a magazine into the rod guide pipe, characterized by the rod guide pipe being formed by two guide elements which can be lifted off each other for inserting the rodlike workpiece, and that the magazine is mounted adjacent the guide elements, said guide elements being respectively rotatably mounted about spaced axes and each having several separate recess means for respective support of rodlike workpieces of varying diameters, and means for controlling the rotational position of the guide elements to align like size recess means of respective guide elements to form said pipe, in each rotational position of the guide elements for which workpiece feeding occurs.

2. A device according to claim 1 wherein, for longer rodlike workpieces, there are provided a plurality of guide element pairs, said guide element pairs being spacedly disposed along the axes.

3. A device according to claim 2 wherein said guide elements have a plurality of outer surfaces arranged in a polygonal shape with each surface having a said recess means comprising a channel-like holding recess adapted to hold said rodlike workpieces.

4. A device according to claim 2 wherein said guide elements are rotatable around their respective longitudinal axes.

5. A device according to claim 2, including spaced continuous shafts supported along said respective spaced axes, said means for controlling the rotational position of said guide elements controlling the rotation of said shafts.

6. A device according to claim 2 wherein two parallel shafts are provided along said spaced axes with at least one of said guide elements mounted on each shaft, with the two shafts rotating synchronously to keep the two guide elements of each pair respectively aligned to form the rod guide pipe for the rodlike workpiece.

7. A device according to claim 6, including a plurality of bearings supporting the shafts, wherein for inserting a new rodlike workpiece, the distance between said shafts may be changed, and therefore said bearings for one of the shafts are provided at a plurality of first stands and said bearings for the other shaft are provided at the ends of pivot arms located in between said spacedly disposed guide element pairs, said pivot arms may be moved to separate the upper and lower guide elements of each pair from each other.

8. A device according to claim 7, wherein said pivot arms are rotatably mounted at a plurality of second stands and can be operated simultaneously via hydraulic or pneumatic cylinders.

9. A device according to claim 2 wherein for longer rodlike workpieces, first and second stands can be mounted on a common carrying support for supporting and bearing at least two of said pairs of guide elements arranged one after the other along said axes.

10. A device according to claim 9, wherein said first and second stands, said guide elements and at least one section of the magazine are located in an oil sump.

11. A device according to claim 4, including conveyor-like flexible transportation means and a workpiece pusher, wherein each said surface of said guide elements has one guiding recess adjacent and parallel to said holding recess, said guiding recesses being adapted to hold said conveyor-like flexible transportation means and enabling engagement with said workpiece pusher in said respective holding recess.

12. A device according to claim 11, including a lifting device with a plurality of guiding arms located in gaps between said spacedly disposed guide element pairs, said transportation means being held by said guiding arms at a predetermined location inside a selected guiding recess of the guide elements, said lifting device functioning to lift off said transportation means from said workpiece pusher and away from one of said guide elements.

13. A device according to claim 12, wherein said guiding arms are tubular shaped and have means defining a lubricant supply to selected ones of said holding recesses forming part of the guide pipe.

14. A device according to claim 13, including a slotted tube at the end of each said guiding arms, said slotted tube arranged parallel to said guide elements and reaching into a selected guiding recess, said transportation means being conducted through said slotted tube.

15. A device according to claim 12, wherein said workpiece pusher has a blade reaching into a selected guiding recess, wherein said means of transportation has a holder with a preferably u-shaped cutout, and wherein said holder is coupled with or decoupled automatically from said blade of said workpiece pusher by lifting or lowering said transportation means.

16. A device according to claim 12 including a plurality of operating cylinders and wherein said lifting device comprises a plurality of two arm levers, each having one end connected with one of said cylinders and another end that carries one of said guiding arms for said means of transportation.

17. A device according to claim 16, wherein said two-arm levers are rotatably mounted at said second stands.

18. A device according to claim 2, including at least two catching levers being part of the magazine, said catching levers each having a first end for supporting and supplying said workpieces to said guide element pairs and a second end attached to one of a plurality of eccentrics, said catching levers being arranged parallel to each other and being perpendicularly moveable with respect to said guide element pairs by means of a driving shaft common to said eccentrics.

19. A device according to claim 18, wherein each catching lever is guided on a guide roller located about halfway between the rotatable guide elements and a respective eccentric.

20. A device according to claim 18, wherein said first end of the catching lever receiving the rodlike workpiece forms an upward angle and shows a v-shaped cutout.

21. A device according to claim 1, wherein said guide elements are made of plastic.

22. A device according to claim 2, wherein each of said guide elements is about 60 cms. (23.62 inches) long.

23. A device according to claim 11, including a workpiece pusher magazine longitudinally disposed at the end of said guide element pairs for feeding the rodlike workpieces of varying diameters.

24. A device according to claim 23, including a number of workpiece pushers corresponding to the number of holding recesses of one guide element, said workpiece pushes being stored in the workpiece pusher magazine.

25. A device according to claim 24, wherein the workpiece pusher magazine has a polygonal shaped body with a plurality of surfaces corresponding to the surfaces of the guide elements, said plurality of shaped body surfaces each having a receptacle aligned with a said holding recess on the corresponding outer surface of said one guide element, wherein a said workpiece pusher is respectively associated with each surface of said polygonal shaped body.

26. A device according to claim 25, wherein said receptacle is formed by a semicircular pusher guide recess and at least one bracket.

27. A device according to claim 26, where the workpiece pusher has a blade and a gap for the blade of the workpiece pusher is provided between the pusher guide recess and the bracket.

28. A device according to claim 27, wherein the blade of the workpiece pusher, which interacts with the rodlike workpiece to be fed, engages with at least one holder in a respective one of said guiding recesses, preferably in the form of a chain link of the means of transportation.

29. A device according to claim 28, wherein for every holding recess of a said receptacle, corresponding to the diameter of the rodlike workpiece to be fed, is provided at the shaped body, and in the case of a change in diameter of the workpiece to be fed, the guide elements are rotated so that corresponding holding recesses align to form a diameter adjusted guide pipe, the shaped body carrying the matching workpiece pusher being rotated accordingly to align the receptacle of corresponding diameter with said guide pipe, and the relevant workpiece pusher is coupled automatically with the means of transportation when the guide elements are aligned adjacent each other.

30. A device according to claim 29, including a plurality of first stands, wherein the shaped body with the receptacles is mounted between at least two of said first stands and is rotatably coupled with the guide elements.

31. A device according to claim 30, wherein the guide element pairs and shaped body are coupled via jointly driven chain drives.

32. A device according to claim 23, including a spring-loaded locking pin and a recess in each workpiece pusher, said workpiece pushers being secured in an idle position in the workpiece pusher magazine by the spring-loaded locking pin engaging in the recess in the workpiece pusher.

* * * * *